United States Patent
Shanov et al.

(10) Patent No.: US 9,845,243 B2
(45) Date of Patent: *Dec. 19, 2017

(54) COMPOSITE CATALYST AND METHOD FOR MANUFACTURING CARBON NANOSTRUCTURED MATERIALS

(71) Applicant: University of Cincinnati, Cincinnati, OH (US)

(72) Inventors: Vesselin N. Shanov, Cincinnati, OH (US); Andrew Gorton, Albany, NY (US); Yeo-Heung Yun, Greensboro, NC (US); Mark J. Schulz, West Chester, OH (US)

(*) Notice: Subject to any disclaimer, the term of this patent is extended or adjusted under 35 U.S.C. 154(b) by 265 days.

This patent is subject to a terminal disclaimer.

(21) Appl. No.: 14/305,403

(22) Filed: Jun. 16, 2014

(65) Prior Publication Data

US 2014/0295098 A1    Oct. 2, 2014

Related U.S. Application Data (63) Continuation of application No. 11/734,143, filed on Apr. 11, 2007, now Pat. No. 8,753,602.

(Continued)

(51) Int. Cl.
  *B01J 21/18*    (2006.01)
  *C01B 32/162*    (2017.01)
  (Continued)

(52) U.S. Cl.
  CPC ......... *C01B 31/0233* (2013.01); *B01J 21/185* (2013.01); *B01J 23/40* (2013.01);
  (Continued)

(58) Field of Classification Search
  None
  See application file for complete search history.

(56) References Cited

U.S. PATENT DOCUMENTS

| 5,707,916 A | 1/1998 | Snyder et al. |
| 7,074,105 B2 | 7/2006 | Kawate et al. |

(Continued)

FOREIGN PATENT DOCUMENTS

| CN | 1502553 A | 6/2004 |
| CN | 1840471 A | 10/2006 |

(Continued)

OTHER PUBLICATIONS

Fuenzalida et al.; Deep Oxidation of Aluminum by a DC Oxygen Plasma; Concepcion; 2002.*

(Continued)

*Primary Examiner* — Guinever S Gregorio
(74) *Attorney, Agent, or Firm* — Hasse & Nesbitt LLC; Daniel F. Nesbitt (57) ABSTRACT

A method of forming a carbon nanotube array substrate is disclosed. One embodiment comprises depositing a composite catalyst layer on the substrate, oxidizing the composite catalyst layer, reducing the oxidized composite catalyst layer, and growing the array on the composite catalyst layer. The composite catalyst layer may comprise a group VIII element and a non-catalytic element deposited onto the substrate from an alloy. In another embodiment, the composite catalyst layer comprises alternating layers of iron and a lanthanide, preferably gadolinium or lanthanum. The composite catalyst layer may be reused to grow multiple carbon nanotube arrays without additional processing of the substrate. The method may comprise bulk synthesis by forming carbon nanotubes on a plurality of particulate substrates having a composite catalyst layer comprising the group VIII element and the non-catalytic element. In another embodiment, the composite catalyst layer is deposited on both sides of the substrate.

17 Claims, 4 Drawing Sheets

US 9,845,243 B2

Page 2

Related U.S. Application Data (60) Provisional application No. 60/862,123, filed on Oct. 19, 2006.

(51) Int. Cl.

| C01B 31/02 | (2006.01) |
| --- | --- |
| B01J 23/40 | (2006.01) |
| B01J 23/63 | (2006.01) |
| B01J 23/74 | (2006.01) |
| B01J 23/83 | (2006.01) |
| B01J 35/00 | (2006.01) |
| B01J 37/02 | (2006.01) |
| B01J 37/08 | (2006.01) |
| B01J 37/34 | (2006.01) |
| B82Y 30/00 | (2011.01) |
| B82Y 40/00 | (2011.01) |
| D01F 9/12 | (2006.01) |
| D01F 9/127 | (2006.01) |

(52) U.S. Cl.
CPC ............... B01J 23/63 (2013.01); B01J 23/74 (2013.01); B01J 23/83 (2013.01); B01J 35/0013 (2013.01); B01J 37/0217 (2013.01); B01J 37/0221 (2013.01); B01J 37/0226 (2013.01); B01J 37/0238 (2013.01); B01J 37/0244 (2013.01); B01J 37/08 (2013.01); B01J 37/088 (2013.01); B01J 37/348 (2013.01); B01J 37/349 (2013.01); B82Y 30/00 (2013.01); B82Y 40/00 (2013.01); C01B 32/162 (2017.08); D01F 9/12 (2013.01); D01F 9/127 (2013.01); D01F 9/1273 (2013.01); C01B 2202/06 (2013.01); C01B 2202/08 (2013.01); C01B 2202/34 (2013.01); Y10S 977/752 (2013.01)

(56) References Cited

U.S. PATENT DOCUMENTS

| 7,288,321 | B2 | 10/2007 | Liu et al. | |
| --- | --- | --- | --- | --- |
| 7,713,589 | B2 | 5/2010 | Jiang et al. | |
| 2003/0108477 | A1 | 6/2003 | Keller et al. | |
| 2003/0143398 | A1 | 7/2003 | Ohki et al. | |
| 2003/0147802 | A1 | 8/2003 | Smalley et al. | |
| 2004/0005269 | A1* | 1/2004 | Huang | B01J 23/83 423/447.3 |
| 2004/0136121 | A1 | 7/2004 | Mao et al. | |
| 2004/0150312 | A1 | 8/2004 | McElrath et al. | |
| 2005/0000318 | A1 | 1/2005 | Keller et al. | |
| 2005/0106093 | A1 | 5/2005 | Iijima et al. | |
| 2005/0112052 | A1 | 5/2005 | Gu et al. | |
| 2006/0024227 | A1* | 2/2006 | Maruyama | B01J 23/882 423/447.3 |

FOREIGN PATENT DOCUMENTS

| JP | 2004339041 A | 12/2004 |
| --- | --- | --- |
| WO | 0017102 A1 | 3/2000 |
| WO | 2004048263 A1 | 6/2004 |

OTHER PUBLICATIONS

Ago et al., Workfunction of Purified and Oxidised carbon Nanotubes, 1999, Synthetic Metals, 103, pp. 2494-2495.
Alvarez, W.E., et al., "Synergism of Co and Mo in the catalytic production of single-wall carbon nanotubes by decomposition of Co", Carbon (Apr. 2001), vol. 39, No. 4, pp. 547-558.
Blank, V.D., et at., "Structure and phase composition of a catalyst for carbon nanofiber formation", Scripta Materialia (Sep. 7, 2006), vol. 55, pp. 1035-1038.
Cho, W., et al., "Growth termination mechanism of vertically aligned centimeter long carbon nanotube arrays", Carbon (Jan. 6, 2014), vol. 69, pp. 609-620.
Cho, W., et al., "Growth and characterization of vertically aligned centimeter long CNT arrays", Carbon (in Press).
Ci et al., Double wall carbon nanotubes promoted by sulfur in a floating iron catalyst CVD system, 2002, Chemical Physics Letters, 359, 63-67.
De Los Arcos, T., "Is aluminum a suitable buffer layer for carbon nanotube growth?", Chem Phys Lett (Oct. 7, 2003), vol. 380, pp. 419-423.
Deizeit et al., Multiwalled carbon nanotubes by chemical vapor deposition using multilayered metal catalysts, 2002, J. Phys. Chem., 106, 5629-5635.
Futaba, D.N., et al., "84% catalyst activity of water-assisted growth of single walled carbon nanotube forest characterization by a statistical and microscopic approach", J Phys Chem B (Mar. 25, 2006), vol. 110, pp. 8035-8038.
Harutyunyan, A.R., et al., "Hidden features of the catalyst nanoparticles favorable for single-walled carbon nanotube growth", Appl Phys Lett (Apr. 20, 2007), vol. 90, pp. 163120-1-163120-3.
Harutyunyan, A.R., et al., "CVD synthesis of single wall carbon nanotubes under "Soft" conditions", Nano Letters (Mar. 27, 2002), vol. 2, No. 5, pp. 525-530.
Hata, K., et al., "Water-assisted highly efficient synthesis of impurity-free single-walled carbon nanotubes", Science (Nov. 19, 2004), vol. 306, pp. 1362-1364.
Hu, M., et al., "Morphology and chemical state of Co-Mo catalysts for growth of single-walled carbon nanotubes vertically aligned on quartz substrates", J Catalysis (Jul. 1, 2004), vol. 225, pp. 230-239.
Iijima, S., "Helical microtubules of graphitic carbon", Nature (Nov. 7, 1991), vol. 354, pp. 56-58.
Kukovitsky, E.F., et al., "Correlation between metal catalyst particle size and carbon nanotube growth", Chem Phys Lett (Apr. 8, 2002), vol. 355, pp. 497-503.
Liu, K., et al., "Controlled termination of the growth of vertically aligned carbon nanotube arrays", Adv Mater (Mar. 29, 2007), vol. 19, pp. 975-978.
Moisala, A., et al., "The role of metal nanoparticles in the catalytic production of single-walled carbon nanotubes—a review", J Phys Condens Matter (Oct. 10, 2003), vol. 15, pp. S3011-S3035.
Noda, S., et al., "A single combinational method to discover Co—Mo binary catalysts that grow vertically aligned single-walled carbon nanotubes", Carbon (Jan. 9, 2006), vol. 44, pp. 1414-1419.
Okamoto, H., "Fe—Gd (Iron-Gadolinium)", J Phase Equilibria (Dec. 1, 1997), vol. 18, No. 1, pp. 109-111.
Yun et al., Growth Mechanism of Long Aligned Multiwall Carbon Nanotube Arrays by Water-Assisted Chemical Vapor Deposition, 2006, J. Phys. Chem. B, 110, 23920-23925.
Zhang et al., Rapid growth of well-aligned carbon nanotube arrays, 2002 Chemical Physics Letters, 362, 285 290.
International Search Report dated Nov. 27, 2009, for corresponding International Application No. PCT/US2007/079528 (WO2008/105936), filed Sep. 26, 2007 (6 pages).
Written Opinion dated Dec. 7, 2009, for corresponding International Application No. PCT/US2007/079528 (WO2008/105936), filed Sep. 26, 2007 (6 pages).
Australian Patent Office Written Opinion dated Apr. 22, 2010, for corresponding Singapore Patent Application No. 200902638-6 (9 pages).
Japanese Patent Office action dated Nov. 30, 2012 for corresponding Japanese Patent Application JP2009-533422, now Japanese Patent No. 5345061, granted Nov. 20, 2013 (11 pages).
Applicant's response dated May 28, 2013 to Japanese Patent Office action dated Nov. 30, 2012 for corresponding Japanese Patent Application JP2009-533422, now Japanese Patent No. 5345061, granted Nov. 20, 2013 (7 pages).
Granted claims for corresponding Japanese Patent Application JP2009-533422, now Japanese Patent No. 5345061, granted Nov. 20, 2013 (3 pages).
Chinese Patent Office 1st action dated May 3, 2012 for corresponding Chinese Patent Application CN200780045156.X (19 pages).

(56) References Cited

OTHER PUBLICATIONS

Chinese Patent Office 2nd action dated Jan. 25, 2013 for corresponding Chinese Patent Application CN200780045156.X (19 pages).
Granted claims for corresponding Chinese Patent Application CN200780045156.X, now Chinese Patent No. ZL 200780045156.X, granted Nov. 27, 2013 (6 pages).

* cited by examiner

COMPOSITE CATALYST AND METHOD FOR MANUFACTURING CARBON NANOSTRUCTURED MATERIALS

CROSS-REFERENCE TO RELATED APPLICATIONS

This application claims the benefit of U.S. Provisional Application No. 60/862,123 titled "Catalyst and Method for Manufacturing Carbon Nanostructured Materials," filed Oct. 19, 2006, and is a continuation of U.S. application Ser. No. 11/734,143, filed Apr. 11, 2007, the disclosures of which are incorporated by reference in their entireties.

BACKGROUND OF THE INVENTION

Carbon nanotubes are used for a variety of applications such as in sensors, reinforcement in composite materials, and the like. Although there are many different ways to form carbon nanotubes, there are two distinct types of carbon nanotubes, individual nanotubes formed by bulk synthesis and arrays of nanotubes formed by surface or oriented synthesis. The individual nanotubes are much like spaghetti where each nanotube is grown with random orientation. Arrays of aligned nanotubes may include literally billions of nanotubes side-by-side, formed on a substrate.

It has always been a goal to form longer and longer nanotubes. If longer arrays of nanotubes are formed, one can spin nanotubes into fibers that may be stronger and lighter than any existing fibers and that are electrically conductive.

The short length of carbon nanotubes has been a roadblock to many of their applications. Growth of carbon nanotubes with controlled morphology is an intensively investigated area. The ability to grow carbon nanotube arrays having a homogeneous and uniform structure over a large surface area greater than one square centimeter would enable carbon nanotube arrays to be used in many different structural and sensing applications.

Carbon nanotubes have been traditionally formed by chemical vapor deposition of carbon on a catalytic substrate. One effective catalytic substrate is iron. Nickel and cobalt have also been used successfully.

SUMMARY OF THE INVENTION

The present invention is premised on the realization that carbon nanotube arrays with carbon nanotubes having lengths greater than 1 millimeter up to and exceeding 2 centimeters can be obtained by vapor deposition of carbon onto a catalyst coated substrate. The composite catalyst on the substrate is a layered thin film structure comprising a combination of a known nanotube catalyst such as iron, nickel, cobalt or other group VIII elements, in combination with an element that is not an effective catalyst by itself for carbon nanotube formation. In particular, the non-catalytic element is preferably a lanthanide group metal, such as, but not limited to, gadolinium (Gd), lanthanum (La), or europium (Eu). In one preferred embodiment, a composite catalyst layer is at least partially oxidized by thermal treatment in air. The oxidized composite catalyst layer is then reduced to the elemental form prior to introducing reactant gases to grow a carbon nanotube array.

In one embodiment the remaining composite catalyst layer left on the substrate after removing the grown CNT array is reused to grow multiple arrays without additional processing of the substrate.

In another embodiment a particulate substrate is coated by the composite catalyst layer for bulk synthesis of carbon nanotubes.

The objects and advantages of the present invention will be further appreciated in light of the following detailed description and drawings in which:

DETAILED DESCRIPTION

Carbon nanotubes may be grown by a variety of techniques, such as oriented synthesis and bulk synthesis. In oriented synthesis, carbon nanotubes are aligned and grown in the form of an array on a substrate. The array contains many carbon nanotubes grown in one direction. In bulk synthesis, carbon nanotubes are randomly grown on many individual substrates, such as particulate substrates. There are a variety of carbon nanotube morphologies. Carbon nanotubes are usually categorized according to the number of walls that the carbon nanotube has. For example, there are multi-walled carbon nanotubes (MWCNT), double-walled carbon nanotubes (DWCNT), and single-walled carbon nanotubes (SWCNT). As used herein, carbon nanotubes refers generally to any of these morphologies, unless otherwise stated.

Figure 1:
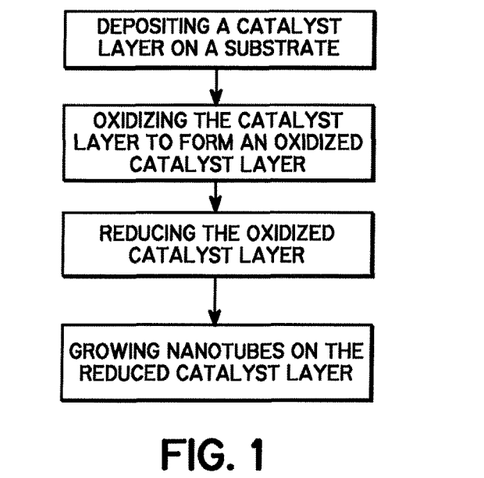
FIG. 1 is a process flow diagram of an embodiment of the method of the invention.
Figure 2:
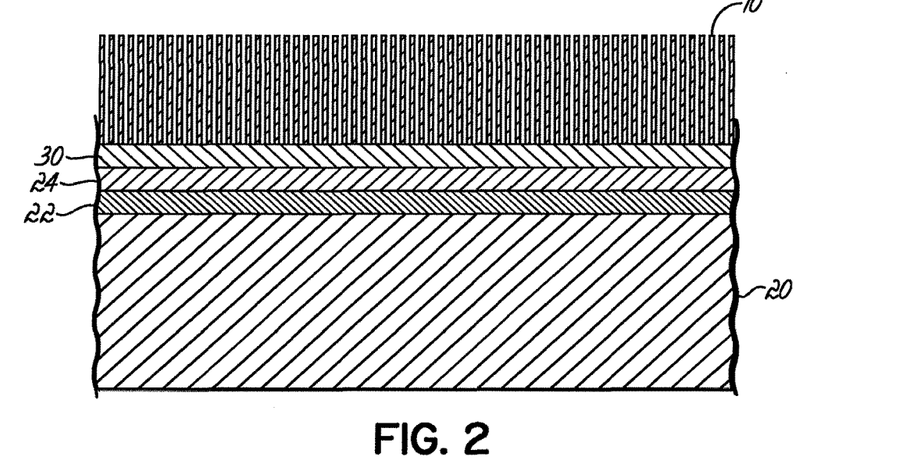
FIG. 2 is a cross-sectional view of an embodiment of a substrate with a composite catalyst layer having a plurality of carbon nanotubes formed thereon.

With reference to FIGS. 1 and 2, in one embodiment of the invention, a carbon nanotube array 10 is formed on a substrate 20 that is compatible with a vapor deposition process. Initially a composite catalyst layer 30 is deposited on the substrate 20 which includes a silicon dioxide layer 22 and an alumina layer 24, as shown in FIG. 2. There are a variety of vapor deposition processes to deposit and treat the various layers of substrate 20. By way of example and not limitation, electron beam deposition, thermal evaporation, spin coating, electrochemical deposition, electroless deposition, plasma spray deposition, magnetron sputtering, pulsed laser deposition (PLD), and chemical vapor deposition (CVD), among others. While reference may be made specifically to CVD, this term includes known modifications to CVD including, for example, plasma enhanced CVD, microwave CVD, and laser enhanced CVD. In addition, other vapor deposition processes may be utilized to grow carbon nanotubes according to the aspects of the present invention.

The substrate 20 is a single crystal silicon wafer because its use in chemical vapor deposition is very well documented. However, any inert substrate can be used, such as ceramics, quartz, polycrystalline silicon, sapphire, alumina, and the like. When the substrate 20 is silicon, it is treated to form the layer of silicon dioxide 22 on its planar surface. A thin film of aluminum is then deposited by, for example, electron beam deposition onto the silicon dioxide layer 22. The thickness of the aluminum layer is not critical. Generally, it will be from about 10 nm to about 20 nm, with 15 nm preferred.

The aluminum is oxidized by plasma oxidation to form the aluminum oxide layer 24, also referred to as alumina. The alumina layer 24 provides a porous surface. This, in effect, creates microscopic cavities throughout the surface of the substrate. These cavities accommodate the composite catalyst layer 30, forming a staging area for nucleation and growth of the nanotube.

The aluminum oxide layer 24 can also be formed by other thin film deposition methods such as direct magnetron sputtering of aluminum oxide, or direct chemical vapor deposition of aluminum oxide. The method of forming the layer of aluminum oxide is not critical for the present invention. Other inert microporous substances can also be used as the base accommodating the catalyst for the carbon nanotube formation.

The composite catalyst layer 30 is then deposited onto the substrate 20 with the silicon dioxide layer 22 and the aluminum oxide layer 24 deposited thereon. Any typical carbon nanotube catalyst can be used. Generally, these will be a group VIII element, including iron (Fe), cobalt (Co), nickel (Ni), ruthenium (Ru), rhodium (Rh), palladium (Pd), osmium (Os), iridium (Ir), and platinum (Pt), or combinations of these. In one embodiment, iron is a preferred catalyst due to its lower melting point and its low cost compared to other group VIII elements.

In addition to the group VIII element, the composite catalyst layer 30 includes a non-catalytic metal, preferably a lanthanide, for example lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Other inert metals such as gold can also be used. The weight percent (wt. %) ratio of group VIII to lanthanide element as the composite catalyst substrate can vary from 5/95 to 95/5. The weight percent ratios that are more effective in producing carbon nanotubes include 20/80, preferably 50/50, and more preferably 95/5.

The composite catalyst layer 30 can be deposited by any well-known method, such as e-beam deposition, magnetron sputtering, or chemical vapor deposition, in one of at least two manners. In order to achieve the desired catalyst ratio, an alloy of the group VIII and the lanthanide element (or non-catalytic metal) can be used to deposit the composite catalyst layer 30. The composite catalyst layer 30 may also be formed by simultaneously sputtering from multiple sputtering targets. The elements sputtered from the targets may then combine on the substrate 20.

Figure 4A:
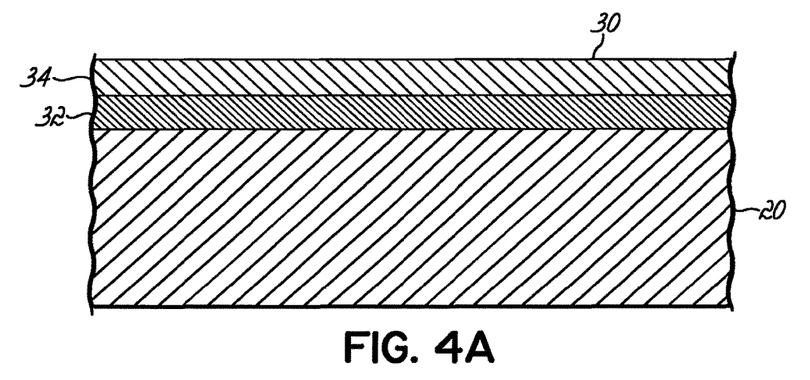
FIG. 4A is a cross-sectional view of another embodiment of the substrate wherein the composite catalyst layer includes alternating layers of the group VIII element and the non-catalytic element.

As shown in FIG. 4A, the composite catalyst layer 30 may also be formed by depositing alternating layers of the group VIII element and the non-catalytic element. The first layer 32 may comprise iron with the second layer 34 comprising gadolinium, or the reverse construction is also possible. The amount or weight percent ratio of the two metals, i.e., iron and gadolinium is controlled by the thickness of the layer.

Figure 4B:
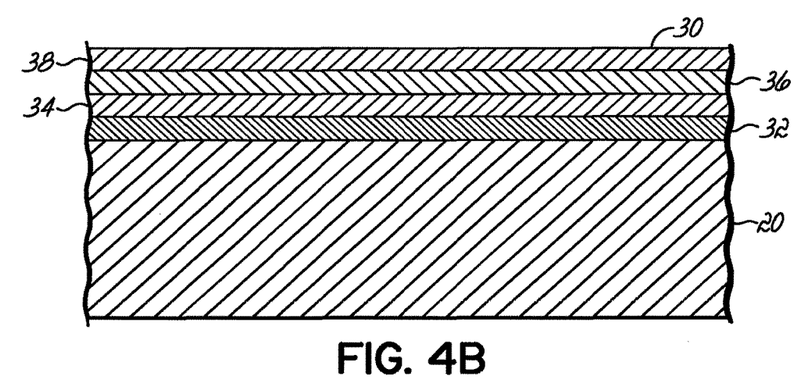
FIG. 4B is a cross-sectional view of another embodiment of the substrate wherein the composite catalyst layer includes four alternating layers of the group VIII element and the non-catalytic element.
Figure 4C:
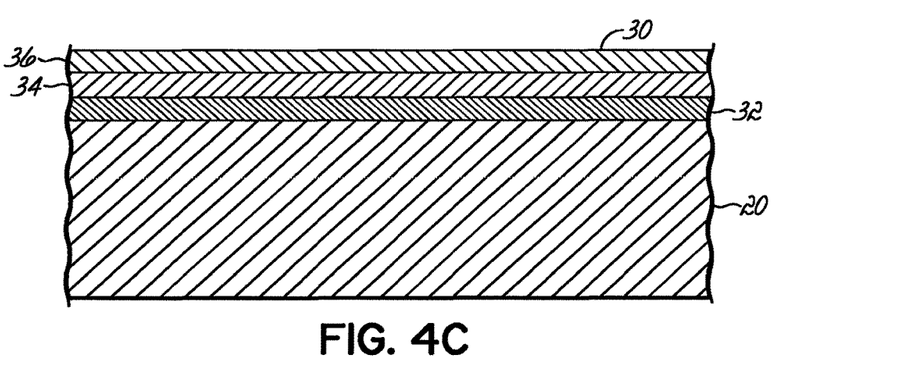
FIG. 4C is a cross-sectional view of another embodiment of the substrate wherein the composite catalyst layer includes three alternating layers of the group VIII element and the non-catalytic element.

As shown in FIG. 4B, multiple alternating layers can be deposited onto one another. FIG. 4B is an illustration of four alternating layers. Again, the thickness and number of layers determine the amount of group VIII and non-catalytic element deposited. The composite catalyst layer 30 may also comprise an odd number of layers, for example the three layers 32, 34, 36 as depicted in FIG. 4C. Thus, the amount of the group VIII element relative to the amount of the non-catalytic element may be modified by changing the number of layers of either the group VIII element or the non-catalytic element. In addition, the individual thicknesses of the layers may be changed to bring about a particular mass ratio of the group VIII element to non-catalytic element in the catalytic layer 30.

The applied thickness of the composite catalyst layer 30 should be from about 0.5 to about 5 nanometers (nm), with between about 1 and about 2 nm being preferred. Thus, the thickness of layers 32 and 34 should each measure about 1 nm. One preferred structure includes one layer of iron having a thickness of about 1 nm and one layer of gadolinium having a thickness of 1 nm. In this case, the weight percent ratio of iron to gadolinium is about 50/50 since the iron and gadolinium densities are approximately the same. With reference to FIG. 4B, another preferred structure includes four alternating layers of iron and gadolinium, each about 0.5 nm thick. For example, a first layer 32 may comprise iron, a second layer 34 may comprise gadolinium, a third layer 36 may comprise iron, and a fourth layer 38 may comprise gadolinium such that the individual thicknesses total about 2 nm. More layers are possible, however, controlling the thickness uniformity becomes increasingly more difficult for layers with thicknesses of 0.5 nm and less. Even though alternating layers are described, the layers may be deposited in different orders.

A third catalytic component can be added to the composite catalyst layer 30. The third component can be an additive catalyst typically used in carbon nanotube growth. These include, for example, yttrium (Yt) and tantalum (Ta), as well as scandium (Sc), titanium (Ti), vanadium (V), chromium (Cr), manganese (Mn), zirconium (Zr), niobium (Nb), molybdenum (Mo), hafnium (Hf), tungsten (W), and rhenium (Rh). These can be added to the composite catalyst layer 30 in the same manner as the group VIII and the non-catalytic elements.

Figure 5A:
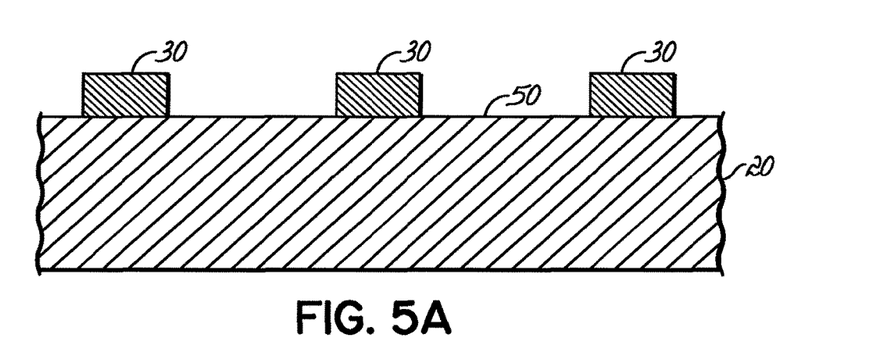
FIG. 5A is a cross-sectional view of another embodiment of the substrate having a discontinuous composite catalyst layer patterned on the substrate.
Figure 5B:
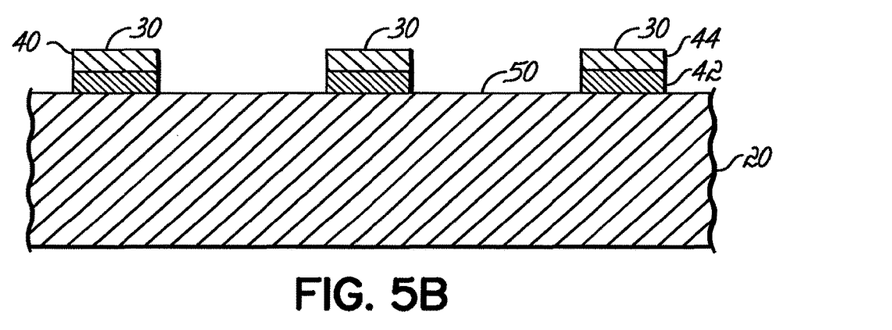
FIG. 5B is a cross-sectional view of another embodiment of the substrate wherein a patterned composite catalyst layer includes alternating layers of the group VIII element and the non-catalytic element.
Figure 5C:
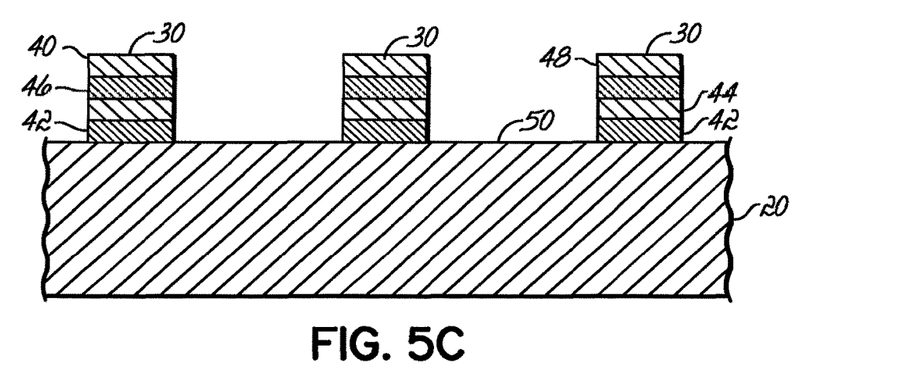
FIG. 5C is a cross-sectional view of another embodiment of the substrate wherein a patterned catalyst layer includes four alternating layers of the group VIII element and the non-catalytic element.

As shown in FIGS. 5A, 5B, and 5C, the composite catalyst layer 30 may be deposited as a discontinuous layer, i.e., in a pattern. The pattern may have a plurality of coated areas 40 of the group VIII element and the non-catalytic element deposited from the alloy, as depicted in FIG. 5A, again with a total thickness preferably of about 2 nm. The coated areas 40 may be separated by an uncoated area 50. Preferably, the areas of catalyst deposition are separated from each other by a spacing of about 0.01 to about 3 millimeters. One preferred pattern consists of 1 millimeter diameter circles of catalyst separated by about 1 millimeter of uncoated substrate, although other patterns are possible. In addition, the pattern may be deposited as a plurality of alternating layers 40, 42 of the group VIII catalyst and the non-catalytic element, as shown in FIG. 5B. Therefore, in one embodiment, the coated areas 40 have a first layer 42, and a second layer 44. The total height of the catalytic layer 30 may be, for example, about 2 nm. Similarly, as illustrated in FIG. 5C, the catalytic layer 30 may include four alternating group VIII/non-catalytic layers 42, 44, 46, 48. The total height of the coated area 40 may be between approximately 0.5 nm and approximately 5 nm with 2 nm being preferred.

Once the composite catalyst layer 30 is deposited, it is desirable to break up the composite catalyst layer 30 into small particles (nanoclusters). This can be accomplished by heating the composite catalyst layer 30 in an air environment at a temperature of between approximately 300 and 900° C., preferably about 300° C. to about 500° C., most preferably about 400° C. for about 5 hours, although the temperature may vary with the composition of the group VIII element. This treatment will at least partially oxidize the group VIII element and cause it to form small (about 4 nm to about 40 nm) nanoclusters of the group VIII oxide in a layer.

The size of the small nanoclusters of the composite catalyst layer 30 may be influenced by the melting temperature of the composite catalyst layer 30. As the melting temperature of the composite catalyst layer 30 decreases, the nanoclusters may decrease in size. The smaller nanoclusters produce smaller diameter carbon nanotubes and promote DWCNT growth. The melting point may be reduced by depositing different metals which have a low melting temperature or alloys forming low temperature eutectics. For example, an iron-lanthanum alloy will have a lower melting point than pure iron or pure lanthanum. Thus, a catalyst deposited from such an alloy or deposited as alternating layers will have a lower melting point than pure iron. The oxidized composite catalyst layer is later reduced forming the metal catalyst nanoclusters prior to growing the carbon nanotube array 10. The oxidized composite catalyst layer is preferably reduced by heating the composite catalyst layer 30 to about 700° C. in hydrogen.

The method of oxidizing and reducing a catalyst layer prior to growing carbon nanotubes produces surprising results even without the lanthanide present. When the composite catalyst layer 30 comprises the group VIII element and the non-catalytic element even better results are achieved.

The carbon nanotube array 10 is grown by thermal chemical vapor deposition utilizing a gas mixture of hydrogen, ethylene, water, and argon. An EasyTube Furnace from First Nano, Inc., can be used, although other known methods of depositing carbon nanotubes can be employed. In one preferred embodiment, the chemical vapor deposition is initiated with an argon flow at about 400° C. followed by hydrogen flow at about 700° C. to convert the group VIII oxide back to elemental group VIII.

The actual growth of the carbon nanotubes start when a mixture of hydrogen, ethylene, water, and argon is applied at a temperature of 700° C. to 800° C., preferably about 750° C. Besides ethylene, other carbon precursors, such as, methane, acetylene, methanol, ethanol and carbon monoxide may be used. The water may be supplied by flowing argon through a water bubbler operating at room temperature. The gas flow is introduced into the reactor for about 10 hours or until carbon nanotube growth stops.

The mixture of the gases flowing into the reactor may vary. For example, the volumetric ratio of argon flowing through a water bubbler to the main argon flow going through the reactor may be between 0.5 and 3, the volumetric ratio of ethylene to argon may be between 0.5 and 1, the volumetric ratio of ethylene to hydrogen may be between 0.5 and 3, and the volumetric ratio of the hydrogen to argon may be between 0.5 to 1. For example, in one preferred embodiment, ethylene is introduced at 200 sccm with argon flowing at 300 sccm, hydrogen flowing at 200 sccm, and argon flowing through the room temperature bubbler at 150 sccm.

The flux of carbon to the catalyst particle is a significant variable that influences the degree to which carbon can be delivered to the substrate, and form carbon nanotubes. The water in the reaction gas is designed to drive off unwanted amorphous carbon that can block the catalyst function. Therefore, about 150 sccm of argon carrier gas is passed through a bubbler to carry a sufficient amount of water to remove the amorphous carbon but not the graphitic carbon that forms the carbon nanotubes. The carbon vapor deposition is continued as long as the carbon nanotubes continue to grow. Before the growth stops, additional catalysts can be added to promote further growth. Specifically, ferocene or iron pentacarbonyl can be added to the reaction mixture, which will then deposit iron onto the surface of the nanotubes, which will act as a catalyst to further increase growth.

Figure 3:
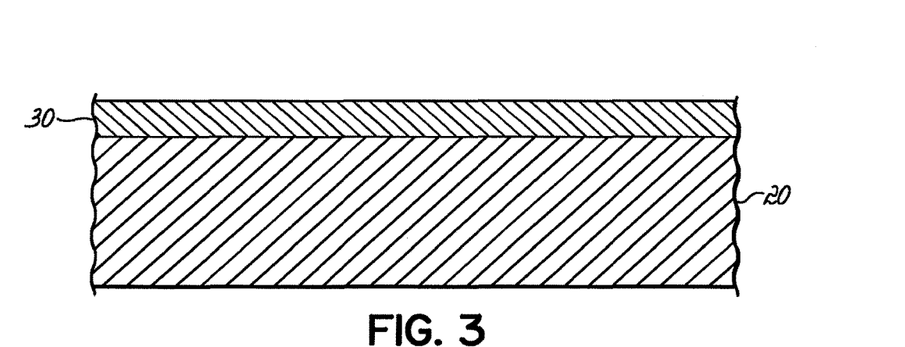
FIG. 3 is a cross-sectional view of another embodiment of the substrate having the composite catalyst layer deposited from an alloy comprising a group VIII element and a non-catalytic element.

The carbon nanotubes grown in accordance with another embodiment of the method include MWCNTs when the composite catalyst layer 30, as shown in FIG. 3, is deposited from an alloy of the group VIII element and the non-catalytic element, for example from an alloy of iron and gadolinium. Thus, the iron and gadolinium are deposited substantially simultaneously. Generally the MWCNTs exhibit a diameter of about 20 nanometers. In another embodiment with the composite catalyst layer 30 deposited, as shown in FIG. 4A with one layer of iron of about 1 nm with one layer of lanthanum about 1 nm thick on top, the MWCNTs have diameters of about 15 nm. MWCNTs and some DWCNTs grow when the composite catalyst layer 30 is deposited in alternating layers of iron and gadolinium, as illustrated in FIGS. 4A and 4B. While the alternating layers, previously described, are more cost effective than the alloy, they also generally grow carbon nanotubes having lengths greater than the carbon nanotubes grown on the composite catalyst layer 30 deposited from the alloy.

SWCNTs may grow by controlling the composition of the composite catalyst layer 30, the structure of the composite catalyst layer 30, annealing of the composite catalyst layer 30, the nature of the carbon precursor, and the growth conditions in the reactor. The composition of the composite catalyst layer 30 may affect the number of walls of the carbon nanotube. As the atomic radius of the group VIII and the non-catalytic elements decrease, the size of the catalyst nanoparticles produced during annealing of the composite catalyst layer 30 decreases. The smaller sized catalyst particles (nanoclusters) produce smaller diameter carbon nanotubes. In addition to the atomic radius of the catalyst, the layered structure of the catalyst influences the size of the carbon nanotubes. An annealing temperature that produces smaller particles during the thermal treatment in air may permit SWCNTs and DWCNTs to grow, preferably the catalyst particles produced should be below 5 nm in size. To produce small catalyst particles the temperature during a short thermal treatment of 10 minutes should preferably be above 500° C. and close to 900° C.

The carbon precursors, like ethylene and acetylene are reactive at elevated temperatures and have higher decomposition rates and are likely to grow MWCNT because they generate higher carbon flux. To grow SWCNT and DWCNT, the amount of reactive carbon is reduced by selecting an appropriate precursor, such as methane. Methane is more thermally stable than ethylene and acetylene and thus requires less management, such as dilution for controlled carbon partial pressure and carbonflux.

The growth conditions in the reactor, particularly the flow rates of the hydrogen gas, argon gas, carbon precursor, and the temperature, affect the morphology of the carbon nanotube growth. Hydrogen is introduced to dilute the precursor and to control the decomposition of the hydrocarbon precursor. Thus controlling hydrogen flow can prevent unnecessary excess of carbon within a carbon nanotube growth zone, particularly amorphous carbon. The greater the flow rate of hydrogen gas the higher the probability of SWCNT growth. Hydrogen and argon act as diluting gases preventing amorphous carbon formation. Argon flow dilutes the carbon precursor and decreases the flux of carbon atoms towards the growth zone. As the flux of carbon atoms decreases the probability of SWCNT growth increases because the hydrogen may prevent the formation of amorphous carbon. The flow of the carbon precursor should likewise be kept low to prevent the formation of amorphous carbon. Low carbon precursor flow rate is more likely to produce SWCNT growth.

The growth temperature influences the morphology of the carbon nanotube. In general, elevated temperatures increase the surface mobility of the carbon atoms. Thus higher temperatures, preferably between about 800° C. and 1000° C., increase the probability of growing carbon nanotubes having a minimum number of walls. However, high temperatures also increase the decomposition rate of the precursor. The higher decomposition rate may therefore be balanced with an increase in the flow of argon and/or hydrogen gas to control the carbon flux and help prevent formation of amorphous carbon.

One preferred reactor uses a three-zone furnace. The growth is conducted in a middle zone. In the first zone the reactant gases are preheated to for example 450° C. In the third section, the exhaust gases are maintained at a higher temperature, such as 400° C. Thus, the three-zone furnace helps control the temperature in the middle zone.

In one embodiment, improved production of the carbon nanotubes is achieved by using the composite catalyst layer 30 to regrow multiple arrays 10 on a same substrate without additional processing of the substrate 20. In other words, by removing the carbon nanotubes from the composite catalyst layer 30, additional carbon nanotubes may be grown on the same composite catalyst layer 30. The composite catalyst layer 30 is not reprocessed between successive periods of growing carbon nanotubes. By way of example, removing the grown carbon nanotubes from the composite catalyst layer 30 may only require a slight physical pressure, particularly when the carbon nanotubes are in the reactor at elevated temperatures. Growth of additional carbon nanotubes on the composite catalyst layer 30 follows removal of the preceding carbon nanotubes. Thus, a single substrate 20 having a composite catalyst layer 30 may yield multiple arrays 10 of carbon nanotubes.

The composite catalyst layer 30 can also be deposited on two opposing sides of the substrate 20 for increased productivity. The substrate 20 is oriented, for example on one edge, such that each composite catalyst layer 30 on both sides of the substrate 20 is exposed to the reactant gases. The carbon nanotubes grow according to the previously described procedure; however, the carbon nanotubes grow from each side of the substrate 20 simultaneously. In addition, or alternatively, increased productivity may be obtained by depositing the composite catalyst layer 30 over very large substrates, such as on substrates exceeding tens of centimeters along each dimension. For example, the composite catalyst layer 30 may be deposited with magnetron sputtering onto these large substrates. The composite catalyst layer 30 may also be deposited with CVD technique on these large substrates.

Figure 6A:
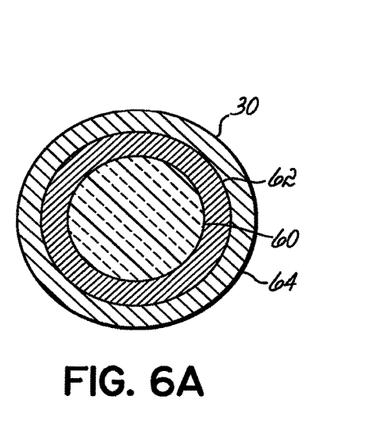
FIG. 6A is a cross-sectional view of another embodiment with a particulate substrate with the composite catalyst layer deposited in two alternating layers of the group VIII element and the non-catalytic element.
Figure 6B:
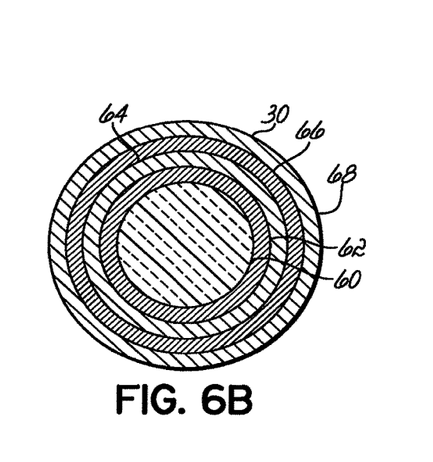
FIG. 6B is a cross-sectional view of another embodiment of the particulate substrate having the catalytic substrate deposited in four alternating layers of the group VIII element and the non-catalytic element.
Figure 6C:
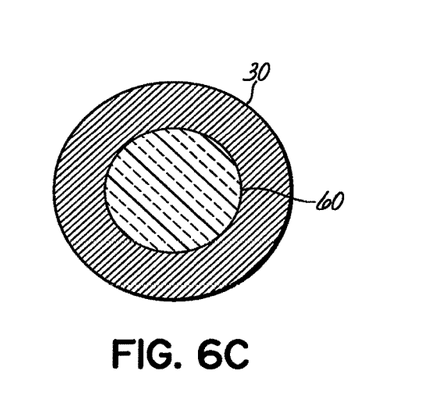
FIG. 6C is a cross-sectional view of another embodiment of the particulate substrate with the catalytic substrate deposited as an alloy of the group VIII element and the non-catalytic element.

Bulk synthesis of carbon nanotubes are grown on a plurality of particulate substrates 60. FIGS. 6A, 6B, and 6C illustrate cross sections of spherical particulate substrates 60. However, the shape of the particulate substrate 60 is not critical. The particulate substrate 60 is generally a nonreactive, refractory particle having high temperature stability, for example, magnesium oxide (MgO), alumina ($Al_2O_3$), silica ($SiO_2$), or other oxides.

The composite catalyst layer 30 is preferably deposited onto the particulate substrate 60 in alternating layers, discussed above. The individual layers comprise the group VIII element or the non-catalytic element. For example, as shown in FIG. 6A, the composite catalyst layer 30 coats the particulate substrate 60 such that a first layer 62 coats the particulate substrate 60 and the second or outer layer 64 coats the first layer 62. One preferred structure has alternating layers of iron and gadolinium. In another embodiment, the composite catalyst layer 30 has four alternating layers of the group VIII element and the non-catalytic element. For example, as depicted in FIG. 6B, the first layer 62 comprising iron is deposited on the particulate substrate 60 with a second layer 64 comprising gadolinium is deposited on the first layer 62, a third layer 66 comprising iron is deposited on the second layer 64, and a fourth layer 68 comprising gadolinium is deposited on the third layer 66.

The catalyst layer 60 may be deposited from an alloy to create the catalytic layer 30 on the particulate substrate 60. For example, as illustrated in FIG. 6C, the particulate substrate 60 may be coated from an alloy comprising iron and gadolinium.

The composite catalyst layer 30 can be deposited onto the particulate substrate 60 and the substrate 20 by any well-known method, such as a plasma deposition system, e.g., an radio-frequency plasma or a microwave plasma CVD. With the plasma deposition, the group VIII element and the non-catalytic element can be bonded to the particulate substrate 60 or the substrate 20. For example, the plasma CVD produces the composite catalyst layer 30 having iron onto the particulate substrates 60 when ferrocene vapor, $Fe(C_5H_5)_2$ is introduced into the plasma. Similarly, in another example, iron deposits when an iron precursor, such as iron pentacarbonyl, $Fe(CO)_5$ is introduced into the system. To deposit a composite catalyst layer 30 having gadolinium, a gadolinium precursor is introduced, such as gadolinium chloride $GdCl_3$, gadolinium propoxide $Gd(OC_3H_7^i)$, gadolinium (2,2,6,6-tetramethyl-3,5-heptanedionate), $Gd(C_{11}H_{19}O_2)_3$ tris(cyclopentadienyl), gadolinium $(C_5H_5)_3$Gd tris(tetramethylcyclopentadienyl), and gadolinium $[(CH_3)_4C_2H]_3Gd$. Any of the precursors having low vapor pressure may be introduced into the plasma system with a bubbler, either from solid state or from solution. Similarly, other group VIII elements can be introduced into the plasma system in order to deposit the composite catalyst layer 30 onto the particulate substrate 60 or the substrate 20.

Other methods such as electro-less deposition, electrochemical deposition, calcination on the particulate substrate 60 in the presence of one or more salts comprising the catalyst layer composition, CVD, e-beam deposition, magnetron sputtering, thermal evaporation, sol-gel synthesis, ball milling the particulate substrates 60 within a mixture of one or more salts or oxides comprising the group VIII element or the non-catalytic element or a combination of oxides and salts, or any thin film technique may be used to deposit the composite catalyst layer 30. Next, bulk synthesis of carbon nanotubes on the particulate substrates 60 proceeds according to the growing step as outlined above with respect to the carbon nanotube array 10.

The invention can also be practiced using a floating catalyst. In this embodiment the catalyst is introduced as a gas using, for example, vaporized ferrocene or cobaltocene and gadolinium chloride gas. The catalyst gases are introduced with the reactant gases, such as ethylene, as previously described. Generally the catalyst gas will comprise about 1 to about 3 volume % of the total gas flow into the reactor. The catalyst will be about 95 to about 5 wt. % of the group VIII element and about 5 to about 95 wt. % of the lanthanide element, as with the layered composite catalyst 30.

In order to facilitate a more complete understanding of the method of the invention, the following non-limiting examples are provided.

Example 1

A 15 nm Al film was deposited by e-beam deposition onto an oxidized single crystal silicon wafer. The SiO$_2$ layer had a thickness of approximately 500 nm. The Al film was converted into aluminum oxide by exposing it for about 10 minutes in a radio frequency plasma environment containing about 20 vol. % O$_2$ and about 80 vol. % Ar. The radio frequency plasma power was 300 W and the oxidation was performed at pressure of 60 Torr.

A composite catalyst layer having a thickness of about 2 nm was deposited by e-beam deposition on top of the aluminum oxide. The composite catalyst layer was formed from an alloy of about 80 wt. % iron and about 20 wt. gadolinium.

The substrate and the composite catalyst film were then thermally annealed for 5 hours at 400° C. in air. Following annealing, the substrate was loaded into a CVD reactor to grow a carbon nanotube array. The reactor was purged with about 1000 sccm argon for about 10 minutes at room temperature before the temperature was increased. The substrate and the composite catalyst layer where heated to about 400° C. and held at that temperature for about 20 minutes to permit the argon flow to preheat. To reduce the oxidized composite catalyst layer, the temperature was increased up to 700° C. and a flow of about 200 sccm hydrogen was introduced into the reactor for about 15 minutes. The temperature of the CVD reactor was increased to about 750° C. The substrate and reduced composite catalyst layer were held at that temperature for about 10 hours while several gases were introduced into the reactor to grow the carbon nanotube array.

The following gases and their flow rates were adjusted and introduced into the reactor to grow the carbon nanotube array: ethylene at 200 sccm, Ar at 300 sccm, and water vapor carried by Ar flowing at 150 sccm passing through a room temperature bubbler, and hydrogen at 200 sccm. After ten hours, the reactor was cooled to room temperature in a flow of 500 sccm Ar. This method produced a CNT array having carbon nanotubes of approximately 7 mm in length.

Example 2

A composite catalyst layer was deposited onto a silicon substrate prepared as described in Example 1. The composite catalyst layer had a thickness of about 2 nm and was formed from an alloy having an iron to gadolinium weight percent ratio of about 50/50.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 5 mm in length.

Example 3

A composite catalyst layer was deposited onto a silicon substrate prepared as described in Example 1. The composite catalyst layer had a thickness of about 2 nm and was formed from an alloy having an iron to gadolinium weight percent ratio of about 20/80.

The substrate and the composite catalyst layer were annealed and reduced according to the procedure described in Example 1. In addition, the nanotubes were grown under conditions similar to the Example 1 conditions and time.

This method produced a CNT array having carbon nanotubes of approximately 7.5 mm in length.

Example 4

A composite catalyst layer was deposited onto a silicon substrate prepared as described in Example 1. The composite catalyst layer had a thickness of about 2 nm and was formed from an alloy having an iron to gadolinium weight percent ratio of about 95/5.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 7 mm in length.

Example 5

A composite catalyst layer, having two alternating layers, was deposited on a silicon substrate prepared as described in Example 1. The composite catalyst layer was formed with a gadolinium layer having a thickness of about 1 nm on top of an iron layer having a thickness of about 1 nm.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 8 mm in length.

Example 6

A composite catalyst layer having two alternating layers was deposited on the silicon substrate prepared as described in Example 1. The composite catalyst layer was formed by depositing an iron layer having a thickness of about 1 nm on top of a gadolinium layer having a thickness of about 1 nm.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 6 mm in length.

Example 7

A composite catalyst layer, having four alternating layers, was deposited on the silicon substrate prepared as described in Example 1. The composite catalyst layer was formed from four alternating layers with each layer having a thickness of about 0.5 nm. The layers were deposited as follows: iron, gadolinium, iron, and gadolinium, with gadolinium being the topmost layer.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 11.5 mm in length.

This procedure was independently reproduced with a three zone CVD reactor and 18 mm growth was achieved.

Example 8

A composite catalyst layer, having four alternating layers, was deposited on the silicon substrate prepared as described in Example 1. Each layer had a thickness of about 0.5 nm. The layers were deposited as follows: gadolinium, iron, gadolinium, and iron, with iron being the topmost layer.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 9 mm in length.

Example 9

A composite catalyst layer having a thickness of approximately 2 nm was deposited from an alloy having a weight percent ratio of iron to gadolinium of about 80/20 by e-beam deposition through a shadow mask with holes of 1 mm in diameter and spacing between the holes of 1 mm. This procedure created a patterned composite catalyst substrate.

The substrate and the composite catalyst layer were annealed and reduced according to the procedures described in Example 1. In addition, the nanotubes were grown under conditions similar to the Example 1 conditions, except the CNT array was grown over 6 hours rather than 10 hours.

This method produced a CNT array of uniform posts having carbon nanotubes of approximately 8 mm in length.

Example 10

A composite catalyst layer having a thickness of approximately 2 nm was deposited from an alloy having an iron to gadolinium weight percent ratio of about 50/50 by e-beam deposition through a shadow mask with holes of 1 mm in diameter and spacing between the holes of 1 mm. This procedure created a patterned composite catalyst substrate.

The substrate and the composite catalyst layer were annealed and reduced according to the procedures described in Example 1. In addition, the nanotubes were grown under conditions similar to the Example 1 conditions and time.

This method produced a CNT array of uniform posts having carbon nanotubes of approximately 5 mm in length.

Example 11

A composite catalyst layer having a thickness of approximately 2 nm was deposited from an alloy having an iron to gadolinium weight percent ratio of about 20/80 by e-beam deposition through a shadow mask with holes of 1 mm in diameter and spacing between the holes of 1 mm. This procedure created a patterned composite catalyst substrate.

The substrate and the composite catalyst layer were annealed and reduced according to the procedures described in Example 1. In addition, the nanotubes were grown under conditions similar to the Example 1 conditions and time.

This method produced a CNT array of uniform posts having carbon nanotubes of approximately 6 mm in length.

Example 12

A composite catalyst layer having a thickness of approximately 2 nm was deposited from an alloy having an iron to gadolinium weight percent ratio of about 95/5 by e-beam deposition through a shadow mask with holes of 1 mm in diameter and spacing between the holes of 1 mm. This procedure created a patterned composite catalyst substrate.

The substrate and the composite catalyst layer were annealed and reduced according to the procedures described in Example 1. In addition, the nanotubes were grown under conditions similar to the Example 1 conditions and time.

This method produced a CNT array of uniform posts having carbon nanotubes of approximately 2.5 mm in length.

Example 13

A composite catalyst layer was deposited through a shadow mask with holes of 1 mm in diameter and spacing between the holes of 1 mm. The composite catalyst layer was comprised of four alternating layers with each layer having a thickness of about 0.5 nm. The layers were deposited as follows: iron, gadolinium, iron, and gadolinium with gadolinium being the topmost layer.

The substrate and the composite catalyst layer were annealed and reduced according to the procedures described in Example 1. In addition, the nanotubes were grown under conditions similar to the Example 1 conditions and time.

This method produced a CNT array of uniform posts having carbon nanotubes of approximately 8 mm in length.

Example 14

A composite catalyst layer having a thickness of approximately 2 nm was deposited from an alloy having an iron to gadolinium weight percent ratio of about 80/20 by e-beam deposition through a shadow mask with holes of 0.1 mm in diameter and spacing between the holes of 0.1 mm.

The substrate and the composite catalyst layer were annealed and reduced according to the procedures described in Example 1. In addition, the nanotubes were grown under conditions similar to the Example 1 conditions and time.

This method produced a CNT array of uniform posts having carbon nanotubes of approximately 8 mm in length.

Example 15

A composite catalyst layer having a thickness of approximately 2 nm was deposited from an alloy having an iron to gadolinium weight percent ratio of about 80/20 by e-beam deposition through a shadow mask with holes of 0.01 mm in diameter and spacing between the holes of 0.01 mm. The shadow mask was comprised of polymethyl methacrylate (PMMA) which was manufactured directly on the surface of the substrate using e-beam lithography.

The substrate and the composite catalyst layer were annealed and reduced according to the procedures described in Example 1. In addition, the nanotubes were grown under conditions similar to the Example 1 conditions, except that the CNT array was grown for one hour rather than 10 hours.

This method produced a CNT array of uniform posts having carbon nanotubes of approximately 0.5 mm in length.

Example 16

A composite catalyst layer was deposited with lanthanum rather than gadolinium. The composite catalyst layer was formed with a layer of lanthanum on top of a layer of iron. Each layer had a thickness of approximately 1 nm.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 9 mm in length.

Example 17

A composite catalyst layer was deposited with lanthanum rather than gadolinium. The composite catalyst layer was formed with a layer of iron on top of a layer of lanthanum. Each layer had a thickness of approximately 1 nm.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 10 mm in length.

Example 18

A composite catalyst layer was deposited with gold rather than gadolinium. The composite catalyst layer formed with a layer of gold on top of a layer of iron. Each layer had a thickness of approximately 1 nm.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 1 mm in length.

Example 19

A composite catalyst layer was deposited with gold (Au) rather than gadolinium. The composite catalyst layer was therefore formed of a layer of gold on top of a layer of iron with each layer having a thickness of approximately 1 nm. The substrate was annealed for 10 minutes at 850° C. in air and then loaded into the CVD reactor. The nanotubes were grown under conditions similar to the Example 1 conditions and time.

This method produced a CNT array having carbon nanotubes of approximately 0.3 mm in length.

Example 20

The composite catalyst layer was deposited from an alloy of approximately 20 wt. % iron and approximately 80 wt. % gadolinium. The composite catalyst layer was about 2 nm thick. The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 7.5 mm in length.

This CNT array was removed from the substrate and the substrate was placed directly into the CVD reactor without any additional processing. The substrate and the composite catalyst layer were again exposed to the growth conditions described in Example 1. This method produced a CNT array having carbon nanotubes of approximately 1 mm in length.

Example 21

A composite catalyst layer having four alternating layers was deposited on the substrate prepared as described in Example 1. Each alternating layer had a thickness of about 0.5 nm. The layers were deposited as follows: iron, gadolinium, iron, and gadolinium, with gadolinium being the topmost layer.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 11 mm in length.

This CNT array was removed from the substrate and the substrate was placed directly into the CVD reactor without any additional processing. The substrate and the composite catalyst layer were again exposed to the growth conditions described in Example 1. This method produced a CNT array having carbon nanotubes of approximately 8 mm in length. This procedure was independently reproduced in a three zone CVD reactor, as previously described.

Example 22

A composite catalyst layer was deposited with lanthanum rather than gadolinium. The composite catalyst layer comprised a layer of lanthanum on top of a layer of iron. Each layer had a thickness of approximately 1 nm.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 9 mm in length.

This CNT array was removed from the substrate and the used substrate was placed directly into the CVD reactor without any additional processing. The substrate and the composite catalyst layer were again exposed to the growth conditions described in Example 1. This method produced a CNT array having carbon nanotubes of approximately 1.5 mm in length.

Example 23

A composite catalyst layer was deposited with lanthanum rather than gadolinium. The composite catalyst layer comprised a layer of iron on top of a layer of lanthanum. Each layer had a thickness of approximately 1 nm.

The substrate and the composite catalyst layer were annealed and reduced according to the procedures described in Example 1. In addition, the nanotubes were grown under conditions similar to the Example 1 conditions and time.

This method produced a CNT array having carbon nanotubes of approximately 10 mm in length.

This CNT array was removed from the substrate and the substrate was placed directly into the CVD reactor without any additional processing. The substrate and the composite catalyst layer were again exposed to the growth conditions described in Example 1. This method produced a CNT array having carbon nanotubes of approximately 2 mm in length.

Example 24

A composite catalyst layer, having three alternating layers, was deposited on the silicon substrate prepared as described in Example 1. Each of the layers was about 0.5 nm thick. The composite catalyst layer was formed by depositing iron on the substrate, a gadolinium layer, and another layer of iron on top.

The substrate and the composite catalyst layer were annealed and reduced according to the procedures described in Example 1. In addition, the nanotubes were grown under conditions similar to the Example 1 conditions; however, the array was permitted to grow over about 5 hours rather than 10 hours.

This method produced a CNT array having carbon nanotubes of approximately 3 mm in length.

Example 25

A composite catalyst layer, having three alternating layers, was deposited on the silicon substrate prepared as described in Example 1. Each of the layers was about 0.5 nm thick. The composite catalyst layer was formed by depositing gadolinium on the substrate, an iron layer, and another layer of gadolinium on top.

The substrate and the composite catalyst layer were annealed and reduced according to the procedures described in Example 1. In addition, the nanotubes were grown under conditions similar to the Example 1 conditions; however, the array was permitted to grow over about 5 hours rather than 10 hours.

This method produced a CNT array having carbon nanotubes of approximately 5 mm in length.

Example 26

A composite catalyst layer, having three alternating layers, was deposited on the silicon substrate prepared as described in Example 1. Each of the layers was about 0.5 nm thick. The composite catalyst layer was formed by depositing iron on the substrate, a lanthanum layer, and another layer of iron on top.

The substrate and the composite catalyst layer were annealed and reduced according to the procedures described in Example 1. In addition, the nanotubes were grown under conditions similar to the Example 1 conditions; however, the array was permitted to grow over about 5 hours rather than 10 hours.

This method produced a CNT array having carbon nanotubes of approximately 4 mm in length.

Example 27

A composite catalyst layer, having three alternating layers, was deposited on the silicon substrate prepared as described in Example 1. Each of the layers was about 0.5 nm thick. The composite catalyst layer was formed by depositing lanthanum on the substrate, an iron layer, and another layer of lanthanum on top.

The substrate and the composite catalyst layer were annealed and reduced according to the procedures described in Example 1. In addition, the nanotubes were grown under conditions similar to the Example 1 conditions; however, the array was permitted to grow over about 5 hours rather than 10 hours.

This method produced a CNT array having carbon nanotubes of approximately 3 mm in length.

Example 28

A composite catalyst layer, having two alternating layers, was deposited on a silicon substrate prepared as described in Example 1. The composite catalyst layer was formed with a europium layer having a thickness of about 1 nm on top of an iron layer having a thickness of about 1 nm.

The substrate and the composite catalyst layer were annealed and reduced according to the procedures described in Example 1. In addition, the nanotubes were grown under conditions similar to the Example 1 conditions; however, the carbon nanotubes were grown for a period of about 5 hours rather than 10 hours.

This method produced a CNT array having carbon nanotubes of approximately 1 mm in length.

Example 29

A composite catalyst layer having two alternating layers was deposited on the silicon substrate prepared as described in Example 1. The composite catalyst layer was formed by depositing an iron layer having a thickness of about 1 nm on top of a europium layer having a thickness of about 1 nm.

The substrate and the composite catalyst layer were annealed and reduced according to the procedures described in Example 1. In addition, the nanotubes were grown under conditions similar to the Example 1 conditions; however, the carbon nanotubes were grown for a period of about 5 hours rather than 10 hours.

This method produced a CNT array having carbon nanotubes of approximately 0.1 mm in length.

Example 30

A composite catalyst layer, having four alternating layers, was deposited on the silicon substrate prepared as described in Example 1. The composite catalyst layer was formed from four alternating layers with each layer having a thickness of about 0.5 nm. The layers were deposited as follows: iron, europium, iron, and europium, with europium being the topmost layer.

The substrate and the composite catalyst layer were annealed and reduced according to the procedures described in Example 1. In addition, the nanotubes were grown under conditions similar to the Example 1 conditions; however, the carbon nanotubes were grown for a period of about 5 hours rather than 10 hours.

This method produced a CNT array having carbon nanotubes of approximately 2 mm in length.

Example 31

A composite catalyst layer, having four alternating layers, was deposited on the silicon substrate prepared as described in Example 1. Each layer had a thickness of about 0.5 nm. The layers were deposited as follows: europium, iron, europium, and iron, with iron being the topmost layer.

The substrate and the composite catalyst layer were annealed and reduced according to the procedures described in Example 1. In addition, the nanotubes were grown under conditions similar to the Example 1 conditions; however, the carbon nanotubes were grown for a period of about 5 hours rather than 10 hours.

This method produced a CNT array having carbon nanotubes of approximately 1 mm in length.

As shown in these non-limiting examples, the method of the invention can be used to grow carbon nanotubes exceeding 10 mm in length, and in one example approaching 12 mm in length, over a period of about 10 hours. The carbon nanotubes included MWCNTs and DWCNTs. This has been a description of the present invention along with the preferred method of practicing the present invention. However, the invention itself should only be defined by the appended claims.

What is claimed is:

1. A method of forming a plurality of carbon nanotubes (CNTs), including multiwall carbon nanotubes (MWCNTs) on a substrate, comprising the steps of:
    depositing a composite catalyst layer on said substrate, wherein said composite catalyst layer comprises a group VIII element comprising iron (Fe) and a lanthanide element;
    oxidizing said composite catalyst layer to form an oxidized composite catalyst layer;
    reducing said oxidized composite catalyst layer to form a reduced composite catalyst layer; and
    growing said carbon nanotube on said reduced composite catalyst layer utilizing a gas mixture of hydrogen, carbon precursor, water and argon.

2. The method of claim 1 wherein the lanthanide element comprises Gd.

3. The method of claim 1 wherein the lanthanide element comprises La.

4. The method of claim 1 wherein the lanthanide element comprises Eu.

5. The method of claim 1 wherein said composite catalyst layer has a thickness greater than approximately 0.5 nm.

6. The method of claim 5 wherein said composite catalyst layer has a thickness of between approximately 1 nm and approximately 2 nm.

7. The method of claim 1 wherein said carbon nanotubes are formed in a chemical vapor deposition reactor.

8. The method of claim 1 wherein during depositing said composite catalyst layer, said group VIII element and said lanthanide element are deposited onto said substrate substantially simultaneously.

9. The method of claim 8 wherein said composite catalyst layer comprises at least approximately 5 wt. % of said group VIII element.

10. The method according to claim 1 wherein the substrate includes a layer of aluminum oxide and the composite catalyst layer is deposited on the layer of aluminum oxide.

11. The method according to claim 10 wherein the layer of aluminum oxide is formed by depositing aluminum oxide onto the substrate.

12. The method according to claim 10 wherein the layer of aluminum oxide is formed by depositing an aluminum layer and oxidizing the aluminum layer to aluminum oxide.

13. The method according to claim 12 wherein the aluminum layer is oxidized by plasma oxidation.

14. The method according to claim 1 wherein the composite catalyst layer is applied uniformly on the surface of the substrate.

15. The method according to claim 1 wherein the substrate consists of a substrate having a planar surface.

16. The method according to claim 1 wherein the step of growing the CNTs utilizes a temperature of 700° C. to 800° C.

17. The method according to claim 1 wherein the array aligned CNTs grow to a length of at least 1 mm.

* * * * *